United States Patent
Kong et al.

(10) Patent No.: US 12,545,615 B2
(45) Date of Patent: Feb. 10, 2026

(54) HEAT CHAMFERING APPARATUS AND METHOD

(71) Applicant: Corning Incorporated, Corning, NY (US)

(72) Inventors: Bokyung Kong, Hwasung (KR); JooYoung Lee, Asan-si (KR); Byoung Hoon Moon, Seoul (KR); Kwangje Woo, Suwon-si (KR)

(73) Assignee: CORNING INCORPORATED, Corning, NY (US)

( * ) Notice: Subject to any disclaimer, the term of this patent is extended or adjusted under 35 U.S.C. 154(b) by 198 days.

(21) Appl. No.: 18/285,293

(22) PCT Filed: Mar. 31, 2022

(86) PCT No.: PCT/US2022/022795
§ 371 (c)(1),
(2) Date: Oct. 2, 2023

(87) PCT Pub. No.: WO2022/212684
PCT Pub. Date: Oct. 6, 2022

(65) Prior Publication Data
US 2024/0190753 A1 Jun. 13, 2024

(30) Foreign Application Priority Data

Apr. 1, 2021 (KR) .................. 10-2021-0042840

(51) Int. Cl.
*C03B 33/09* (2006.01)
*C03B 33/03* (2006.01)
(Continued)

(52) U.S. Cl.
CPC .............. *C03B 33/09* (2013.01); *C03B 33/03* (2013.01); *C03B 33/10* (2013.01); *B26D 3/282* (2013.01)

(58) Field of Classification Search
None
See application file for complete search history.

(56) References Cited

U.S. PATENT DOCUMENTS

| 5,855,637 A | 1/1999 | Yakou et al. |
| 6,082,140 A | 7/2000 | Ackler et al. |

(Continued)

FOREIGN PATENT DOCUMENTS

| JP | 2006-317484 A | 11/2006 |
| KR | 10-1345587 B1 | 12/2013 |

(Continued)

OTHER PUBLICATIONS

KR-101486200-B1 EPO Machine Translation retrieved Jul. 22, 2025. (Year: 2025).*

(Continued)

*Primary Examiner* — Lisa L Herring

(57) ABSTRACT

A heat chamfering apparatus. A support unit supports a glass panel. A heat chamfering unit heat-chamfers an edge of the glass panel by applying thermal shock thereto. The support unit includes a contact support portion supporting the glass panel while in contact with the glass panel and a base portion configured to support the contact support portion. The contact support portion is formed from a first material. The base portion is formed from a second material. The first material has a smaller change in temperature due to lower thermal conductivity and a smaller change in size at high temperature due to a smaller coefficient of thermal expansion while being more ductile due to lower hardness, compared to the second material. In a heat chamfering method, a glass panel is located on a support unit, and an edge of the glass panel is heat-chamfered by applying thermal shock thereto.

15 Claims, 4 Drawing Sheets

(51) Int. Cl.
*C03B 33/10* (2006.01)
*B26D 3/28* (2006.01)

(56) References Cited

U.S. PATENT DOCUMENTS

| | | |
|---|---|---|
| 2015/0013391 A1 | 1/2015 | Kim |
| 2017/0297945 A1 | 10/2017 | Lee |
| 2020/0230774 A1 | 7/2020 | Lee et al. |

FOREIGN PATENT DOCUMENTS

| | | | | |
|---|---|---|---|---|
| KR | 10-1405442 B1 | | 6/2014 | |
| KR | 20140131004 A | * | 11/2014 | ............. C03B 33/09 |
| KR | 101486200 B1 | * | 1/2015 | ............. C03B 35/20 |
| KR | 20180009790 A | * | 1/2018 | ............. B23K 26/53 |
| WO | 2016/060386 A1 | | 4/2016 | |
| WO | WO-2020090203 A1 | * | 5/2020 | ........... B23K 26/382 |

OTHER PUBLICATIONS

KR-20140131004-A Clarivate Analytics machine translation retrieved Jul. 23, 2025. (Year: 2025).*
MakeItFromc.om, "Cold Finished 316 Stainless Steel", https://www.makeitfrom.com/material-properties/Cold-Finished-316-Stainless-Steel, available per wayback machine Aug. 2017, 3 pages. (Year: 2017).*
MakeitFrom.com "Graphite", https://www.makeitfrom.com/material-properties/Graphite, available per wayback machine Jun. 2017, 2 pages. (Year: 2017).*
Spacey, "82 Examples of the Mohs Scale", https://simplicable.com/materials/mohs-scale, Sep. 2020, 7 pages. (Year: 2020).*
WO-2020090203-A1 Clarivate Analytics Machine Translation retrieved Jul. 23, 2025. (Year: 2025).*
PeriodicTable.com ("Technical data for Aluminum", https://periodictable.com/Elements/013/data.html, available per Wayback Machine Jun. 2019, 3 pages. (Year: 2019).*
KR-20180009790-A Clarivate Analytics Machine Translation retrieved Jul. 23, 2025. (Year: 2025).*
"DTC 300", Retrieved from: https://www.tainstruments.com/dtc-300/?lang=ko, 2023, 3 pages.
Lee et al., "Advanced Chamfering Technology for Edge Strengthening", J. Am. Ceram. Soc., 97[8], 2014, pp. 2364-2367.
International Search Report and Written Opinion of the International Searching Authority; PCT/US2022/022795; dated Aug. 9, 2022; 8 pages; Commissioner for Patents.
Extended European search report, EP application No. 22782197.2, dated Jan. 8, 2025, 7 pages, European Patent Office.

* cited by examiner

[Fig. 1]
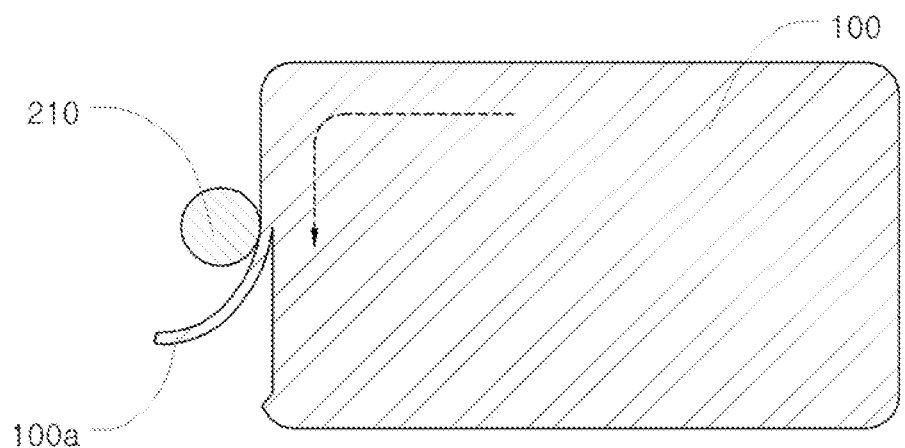
[Fig. 2]
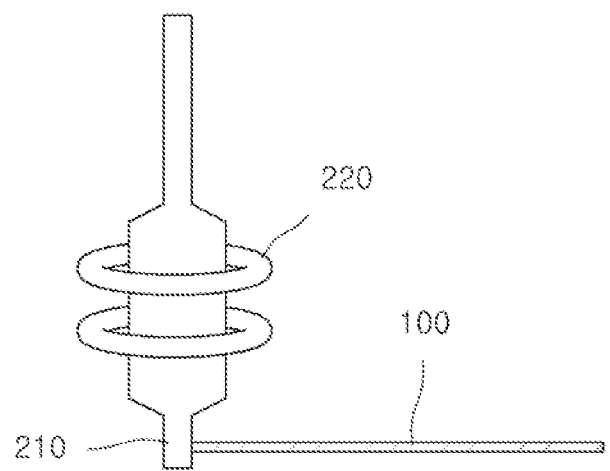

[Fig. 3]
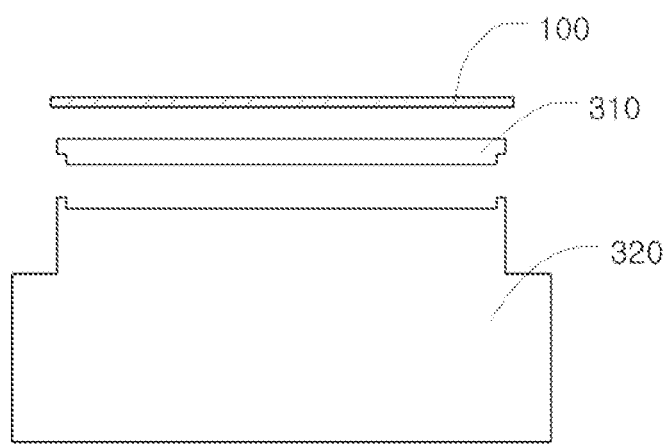
[Fig. 4]
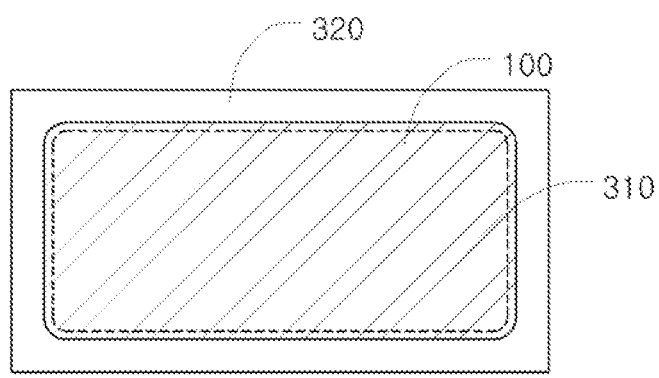

[Fig. 5]
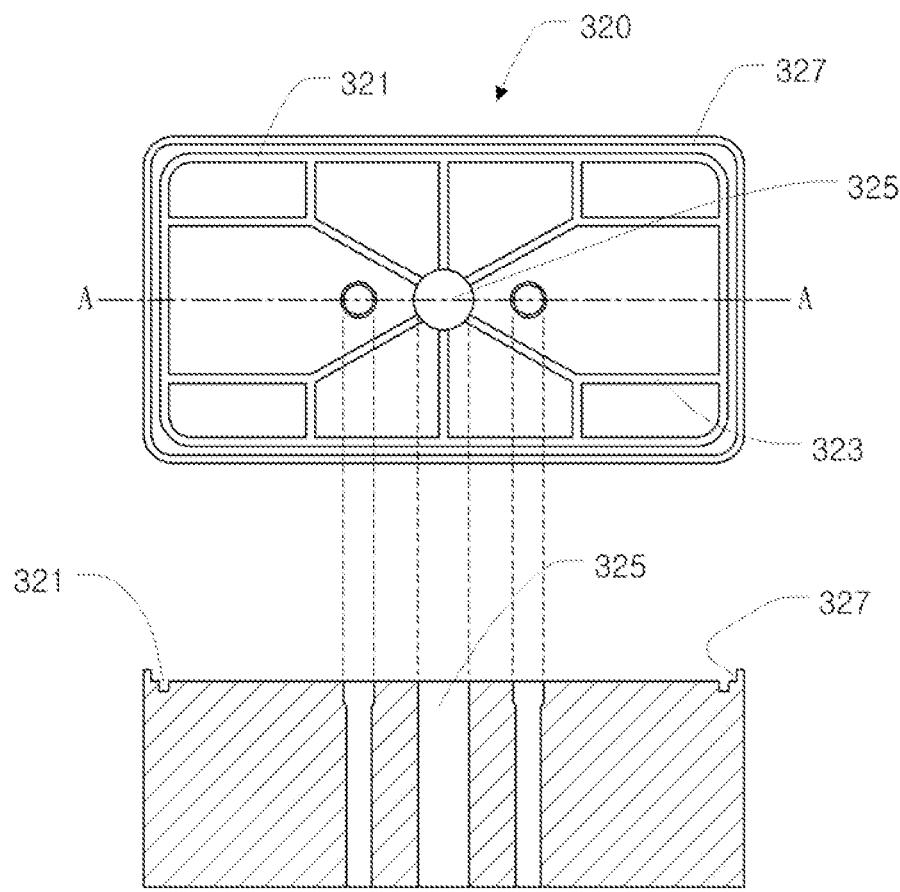
[Fig. 6]
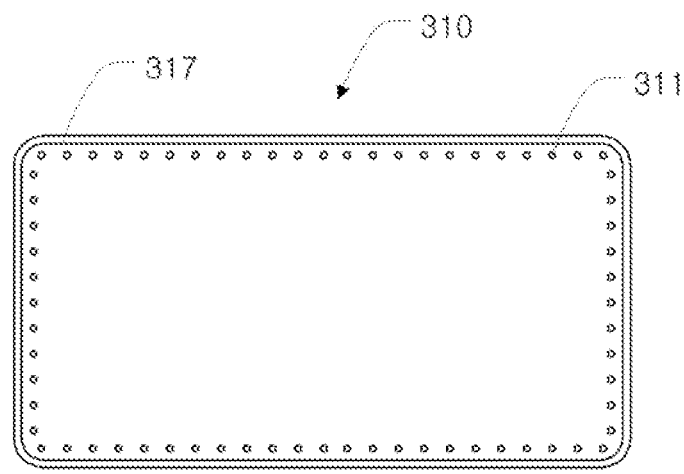

[Fig. 7]
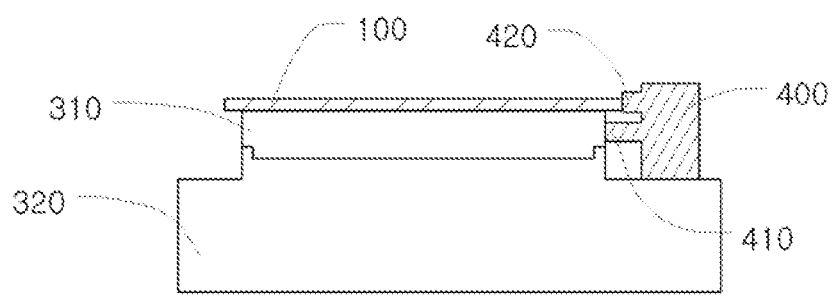
[Fig. 8]
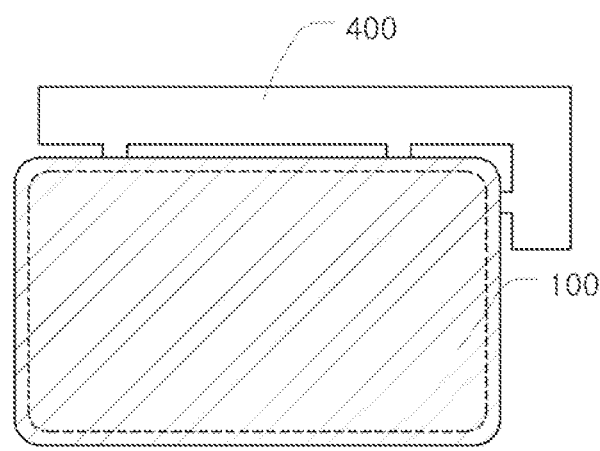

HEAT CHAMFERING APPARATUS AND METHOD

CROSS-REFERENCE TO RELATED APPLICATIONS

This application claims the benefit of priority under 35 U.S.C. § 371 of International Application No. PCT/US2022/022795, filed on Mar. 31, 2022, which claims the benefit of priority under 35 U.S.C. § 119 of Korean Patent Application Serial No. 10-2021-0042840 filed on Apr. 1, 2021, the content of which are relied upon and incorporated herein by reference in their entirety.

BACKGROUND

Field

The present disclosure relates generally to a heat chamfering apparatus and method and, more particularly, to a heat chamfering apparatus in which a support unit supporting a glass panel has a double structure including a contact support portion in direct contact with the glass panel and a base portion supporting the contact support portion, and a heat chamfering method using the same.

Description of Related Art

An edge effect of a glass panel is a main factor in damage to the glass panel, and the damage in turn lowers the reliability of the glass panel. In particular, a flexible device including a thin glass panel requires superior edge quality for reliable bending performance. In such a flexible device, the removal of an edge defect is very important.

Edge finishing may be performed in order to improve the edge strength of a glass panel. From among such edge finishing technologies, a heat chamfering technology is known. Heat chamfering does not cause particles, and is a technology suitable for use with thin glass plates. In addition, heat chamfering may ensure superior edge strength and provide satisfactory bending performance.

SUMMARY

Various aspects of the present disclosure are intended to realize a reliable and accurate heat chamfering process.

According to an aspect, the present disclosure may provide a heat chamfering apparatus including: a support unit supporting a glass panel; and a heat chamfering unit heat-chamfering an edge of the glass panel by applying thermal shock thereto.

In some embodiments, the support unit may include: a contact support portion supporting the glass panel while in contact with the glass panel and formed from a first material; and a base portion supporting the contact support portion and formed from a second material.

In some embodiments, the first material may have a smaller change in temperature due to lower thermal conductivity and a smaller change in size at high temperature due to a smaller coefficient of thermal expansion while being more ductile due to lower hardness, compared to the second material.

In addition, the present disclosure may provide a heat chamfering method including: locating a glass panel on a support unit; and heat-chamfering an edge of the glass panel by applying thermal shock thereto.

As set forth above, the present disclosure may realize a reliable and accurate heat chamfering process.

Accordingly, it is possible to improve process efficiency and reduce process time.

The methods and apparatuses of the present disclosure have other features and advantages that will be apparent from or that are set forth in greater detail in the accompanying drawings, the disclosures of which are incorporated herein, and in the following Detailed Description, which together serve to explain certain principles of the present disclosure.

DESCRIPTION OF THE DRAWINGS

FIG. 1 is a view illustrating a method of heat-chamfering a glass panel according to an embodiment of the present disclosure;

FIG. 2 is a view schematically illustrating a heat chamfering unit of a glass panel heat chamfering apparatus according to some embodiments of the present disclosure;

FIG. 3 is a view schematically illustrating a support unit of the heat chamfering apparatus according to some embodiments of the present disclosure;

FIG. 4 is a plan view schematically illustrating the support unit of the heat chamfering apparatus illustrated in FIG. 4;

FIG. 5 is a view schematically illustrating the base portion of the support unit illustrated in FIG. 3;

FIG. 6 is a view schematically illustrating the contact support portion of the support unit illustrated in FIG. 3;

FIG. 7 is a view illustrating the support unit and an alignment unit of the heat chamfering apparatus according to some embodiments of the present disclosure; and FIG. 8 is a plan view illustrating the support unit and the alignment unit of the heat chamfering apparatus illustrated in FIG. 7.

DETAILED DESCRIPTION

Hereinafter, embodiments of the present disclosure will be described in detail with reference to the accompanying drawings.

FIG. 1 is a view illustrating a method of heat-chamfering a glass panel according to an embodiment of the present disclosure.

An edge of a glass panel 100 may be heat-chamfered by thermal shock applied thereto. Such thermal shock may be induced by the difference between the temperature of the edge of the glass panel 100 heated by a hot body 210 (i.e., a body heated to a high temperature) and the temperature of the remaining portion of the glass panel 100. In some embodiments, the edge of the glass panel 100 may be peeled by moving the hot body 210 heated by a heater 220 along the edge of the glass panel 100 while allowing the hot body 210 to be in contact with the edge of the glass panel 100. Pressure applied to the edge of the glass panel 100 by the hot body 210 during the heat chamfering may be constant. For the relative movement, the glass panel 100 may be moved as illustrated in FIG. 1 (where an arrow depicted in FIG. 1 indicates the direction of the movement of the glass panel), the hot body 210 may be moved or both the glass panel 100 and the hot body 210 may be moved.

The glass panel 100 according to the present disclosure may include panels formed from any glass material (e.g., borosilicate glass).

Although the main plane of the glass panel 100 may have an oblong shape, the glass panel 100 is not limited to a specific shape, such as a polygon, a circle, or an ellipse. In the present disclosure, the glass panel 100 may be a sheet having a thickness (e.g., the measurement in the Z-axis direction) smaller than either the transverse length (e.g., the measurement in the X-axis direction) or the longitudinal length (e.g., the measurement in the Y-axis direction) of the main plane. However, the present disclosure is not limited thereto, and the glass panel 100 may have a variety of shapes, such as a thick block.

For example, when the main plane of the glass panel 100 has an oblong cross-sectional shape and the main plane of the glass panel is an X-Y plane, the hot body 210 may perform chamfering by relatively moving in the X direction and the Y direction while in sequentially being in contact with four edges of the glass panel 100. The relative movement speed may vary depending on the composition of the glass, the temperature conditions, or the shape of the glass panel 100 to be chamfered. In response to this chamfering, a strip 100a is peeled off from the edges of the glass panel 100. In some embodiments, the hot body 210 may perform the chamfering while continuously coming into contact with the four edges without interruption. For example, when the four edges of the glass panel 100 are referred to as a first edge, a second edge, a third edge, and a fourth edge in the clockwise direction, the hot body 210 may chamfer all of the four edges of the glass panel 100 by relatively moving in the X-axis direction until reaching the corner between the first edge and the second edge while being in contact with the first edge, relatively moving in the Y-axis direction until reaching the corner between the second edge and the third edge while being in contact with the second edge, relatively moving in a direction opposing the X-axis direction until reaching the corner between the third edge and the fourth edge while being in contact with the third edge, and then, relatively moving in a direction opposing the Y-axis direction until reaching the corner between the fourth edge and the first edge while being in contact with the fourth edge.

Due to this chamfering, the thin strip 100a may be peeled off from the glass panel 100 without causing particles so as to remove defects from the edges of the glass panel 100 and increase the strength of the glass panel 100.

In some embodiments, the glass panel 100 may perform the chamfering in a situation in which the glass panel 100 is fixedly located on the top surface of a support unit to be described later.

FIG. 2 is a view schematically illustrating a heat chamfering unit of a glass panel heat chamfering apparatus according to some embodiments of the present disclosure.

The heat chamfering apparatus may include the heat chamfering unit heat-chamfering an edge of a glass panel by applying thermal shock thereto.

The heat chamfering unit may include: the hot body 210 configured to peel the edge of the glass panel by applying thermal shock to the glass panel while being in contact with the edge of the glass panel; and the heater 220 heating the hot body.

In some embodiments, the hot body 210 may be a heating rod. In some embodiments, a contact area of the hot body 210 to be in contact with the glass panel 100 may have the shape of a cylinder. In some embodiments, the hot body 210 may be a metal rod. For example, the hot body 210 may be implemented using a metal rod formed from MoSi2. However, the hot body 210 according to the present disclosure is not limited thereto.

The hot body 210 may include a heated area and a contact area in the longitudinal direction thereof, in which the heated area may be heated by the heater 220, and the contact area may be in contact with the glass panel 100. In some embodiments, the cross-sectional area of the contact area (on the plane parallel to the main plane of the glass panel 100) may be smaller than the cross-sectional area of the heated area. Heat applied to the heated area may be transferred to the contact area. The contact area may be located on one end of the hot body 210. The other end of the hot body 210 may be held by a holder (not shown).

At a specific point in time, the hot body 210 may be in point contact or line contact with the glass panel 100 (e.g., the cylindrical portion of the hot body 210 may be in contact with the glass panel 100) or may be in surface contact with the glass panel 100 (e.g., the hot body 210 having a heating surface of a predetermined area may be in contact with the glass panel 100). In some embodiments, the line in the line contact and the surface in the surface contact may be parallel to a side surface (i.e., thickness surface) of the glass panel 100. However, the present disclosure is not limited thereto and the line or surface in contact may be at a predetermined angle to the side surface of the glass panel 100.

The heater 220 may heat the hot body 210 by high-frequency induction heating. The heater 220 may heat the hot body 210 while surrounding the hot body 210. In some embodiments, the heater 220 may be an induction coil. The hot body 210 may extend through the center of the induction coil. In some embodiments, the induction coil may be implemented using a copper (Cu) coil. In addition, the outer surface of the induction coil may be coated with a ceramic material for electrical safety. In some embodiments, cooling water may flow within the induction coil. In some embodiments, the induction coil may heat the hot body 210 to a temperature in a range from about 1200° ° C. to about 1300° C. by transmitting power to the hot body 210.

FIG. 3 is a view schematically illustrating a support unit of the heat chamfering apparatus according to some embodiments of the present disclosure, FIG. 4 is a plan view schematically illustrating the support unit of the heat chamfering apparatus illustrated in FIG. 3, FIG. 5 is a view schematically illustrating the base portion of the support unit illustrated in FIG. 3, FIG. 6 is a view schematically illustrating the contact support portion of the support unit illustrated in FIG. 3, FIG. 7 is a view illustrating the support unit and an alignment unit of the heat chamfering apparatus according to some embodiments of the present disclosure, and FIG. 8 is a plan view illustrating the support unit and the alignment unit of the heat chamfering apparatus illustrated in FIG. 7.

The heat chamfering apparatus may include a support unit supporting the glass panel 100. In some embodiments, the support unit may include a contact support portion 310 supporting the glass panel 100 while being in contact with the glass panel 100 and a base portion 320 supporting the contact support portion 310 while being spaced apart from the glass panel 100 without contact therewith.

The contact support portion 310 may be located closer to the heater 220 than the base portion 320 is. Referring to FIGS. 2 and 3, the heater 220 may be located above the glass panel 100, the contact support portion 310 may be located below@ the glass panel 100, and the base portion 320 may be located below the contact support portion 310.

The contact support portion 310 is a portion that serves to support the glass panel 100 by direct contact with the glass panel 100 during a process so that the process is performed while the glass panel 100 is being in contact with the hot body 210 below a predetermined pressure. The contact support portion 310 may be formed from a first material that may have little temperature change due to the low thermal conductivity thereof, have little size change due to the low coefficient of thermal expansion thereof, and minimize defects caused by surface friction with the glass panel 100 due to the low hardness thereof. The thermal conductivity may be measured in accordance with ASTM E1530 using, for example, DTC300 available from TA Instruments (https://www.tainstruments.com/dtc-300/?lang=ko). The coefficient of thermal expansion may be measured in accordance with ASTM E831, E1545, D696, D3386, ISO 11359: Part 1-3, using, for example, TMA450 available from TA Instruments (https://www.google.com/url?sa=t&rct=j&q=&esrc=s&source=web&cd=&cad=rja&uact=8&ved=2a hUKEwjrusOEhNrvAhUizlsBHercAp0QFjABegQIAxA-D&url=http %3A%2F%2Fwww.jbcc.or.kr%2Findex .php%2Ffile%2Fdownload%2Ffile_no%2F1228%2Fmod%2-Fattach&usg=AOvVaw02luroc290U_Wis3 wP-ffB). As for the hardness, Rockwell, Brinell, or Shore hardness may be measured.

In addition, the contact support portion 310 must be configured to prevent warpage caused by suction force or the like and prevent the edges from being distorted when holding the glass panel 100.

The base portion 320 is a portion supporting the contact support portion 310. The base portion 320 must be configured to properly support the contact support portion 310 so that no gap is formed therebetween. The base portion 320 must also be configured so that suction force is uniformly applied to the entire surface (i.e., entire suction holes) of the contact support portion 310.

In some embodiments, the first material may be implemented using a carbon material, such as isotropic graphite, for example, available from Ibiden Co., Ltd. The contact support portion 310 formed from the carbon material having low thermal conductivity may prevent a temperature increase in the glass panel 100, thereby protecting the glass panel 100 against heat damage. The low coefficient of thermal expansion may prevent a size change during the heat chamfering. In addition, the soft property of the carbon material contributes to the prevention of scratches or the like on the surface of the glass panel 100. The specification of the contact support portion 310 formed from the carbon material according to some embodiments is illustrated in Table 1 below.

TABLE 1

| Term | unit | value |
|---|---|---|
| Density | g/cm3 | 1.72 |
| Bending strength | (MPa) | 47 |
| Tensile strength | (MPa) | 24.5 |
| Compressive strength | (MPa) | 68.5 |
| Resistivity | (μΩcm) | 1.44 |
| Thermal conductivity | (W/mk) | 104.4 |
| Thermal expansion coefficient | ($\times 10^{-6}$/K) | 4.5 |
| modulus of elasticity | (GPa) | 9.8 |
| Hardness | (HS) | 53 |
| Ash contents | (ppm) | 300 |
| Porosity | (%) | 16 |

In some embodiments, the second material may be implemented using aluminum (Al) or an aluminum alloy, such as Al 6061 (i.e., an alloy containing magnesium (Mg) and silicon (Si)). Al has good machinability and high strength, and is lightweight. In addition, due to high thermal conductivity, Al allows cooling to rapidly take place even with the hot body 210 at a high temperature.

A shell-shaped support unit used in the related art holds the glass panel 100 by clamping the glass panel. However, this support unit of the related art has drawbacks, such as a relatively long loading time and inconvenience. In addition, both surfaces of the glass panel 100 are in contact with the support unit, thereby disadvantageously making it difficult to accurately adjust an overhang to be described below.

In some embodiments, a plurality of suction holes 311 configured to hold the glass panel 100 by suction force may be formed in the surface of the contact support portion 310. The suction holes 311 may be connected to a vacuum pump producing low air pressure. When the surface of the glass panel 100 is held by vacuum suction, no fixing tools are required to be provided on side portions of the glass panel 100 to hold the glass panel 100. Thus, the contact between the hot body 210 and the glass panel 100 may be smoothly performed along the four edges of the glass panel 100.

For the thin glass panel 100 which is apt to easily sag and bend, the support unit must be designed such that the glass panel 100 is not deformed when the glass panel 100 is held by the support unit, in particular, by suction. When the suction force is too great, wrinkles may be formed on portions of the glass panel 100 around the suction holes 311. In contrast, when the suction force is too low@, the glass panel 100 may not be properly held. A deformation in the glass panel 100 may inhibit uniform heat chamfering.

The number and size of the suction holes 311 may be minimized to prevent the warpage of the glass panel 100. For example, in the heat chamfering of the thin glass panel 100 having a thickness of 100 μm, the radius of the suction holes 311 may be 0.5 mm. In addition, in some embodiments, the suction holes 311 may be located inside the edge of the contact support portion 310 while being spaced apart from the edge by a distance in a range from 1 mm to 5 mm. In some of such embodiments, the suction holes 311 may be located inside the edge of the contact support portion 310 while being spaced apart 2 mm from the edge. In some embodiments, the pitch between the suction holes 311 may be 2 mm. The suction holes 311 having such dimensions may contribute to reliably holding and preventing the glass panel 100 from being distorted. The suction holes 311 may be located along peripheral portions of the contact support portion 310 and not on the central portion of the contact support portion 310. The sizes of the suction holes 311 according to some embodiments are illustrated in Table 2 below.

TABLE 2

| Parts | size |
|---|---|
| Suction hole radius | Radius 0.5 mm |
| Gap between jig edge and suction hole | 2 mm |
| Pitch of suction hole | 2 mm |
| Radius of corner | 2-5 mm (Depends on panel design) |
| Thickness | 3 mm |

The contact support portion 310 may include a first surface facing the glass panel 100 and a second surface opposing the first surface. The base portion 320 may include a third surface facing the second surface of the contact support portion 310. In some embodiments, a channel 321 communicating with the plurality of suction holes 311 of the contact support portion 310 may be formed in the third surface of the base portion 320 along peripheral portions of the base portion 320. In addition, one or more grooves 323 connecting a vacuum hole 325 and the channel 321 may be formed in the top surface of the base portion 320.

In some embodiments, the contact support portion 310 and the base portion 320 may have mating stepped portions 317 and 327 provided along peripheral portions thereof such that the stepped portions 317 and 327 are engaged with each other. In some embodiments, the channel 321 may be located inside the stepped portions. These embodiments may minimize the leakage of vacuum. In some embodiments, the height of each of the stepped portions 317 and 327 may be about 500 μm.

In some embodiments, the edges of the glass panel 100 need to outwardly overhang the support unit. The overhang ensures that the strip 100a having a sufficient width may be peeled off and removed during the heat chamfering process. In some embodiments, the thickness of the strip 100a removed by the chamfering may be equal to or smaller than about 200 μm. In this regard, the size of the contact support portion 310 may be designed such that the size of the overhang is about 500 μm. When the size of the overhang is too large, sagging may occur in the peripheral portions of the glass panel 100, and the thickness surface of the glass panel 100 may not be parallel to the central axis of the hot body 210, thereby reducing the accuracy of the chamfering. When the size of the overhang is too small, it is impossible to peel off the strip 100a in an intended size. Thus, in order to uniformly perform the chamfering along the entire circumference of the edges of the glass panel 100, it is important to align the glass panel 100 in position with a predetermined overhang size. Since the position associated with the chamfering is influenced by the size of the overhang, the overhang must be accurately controlled. Preferably, the overhang may be uniform along the entire circumference of the glass panel 100. It is required to accurately align and hold the glass panel 100 so that a constant amount of pressure is applied from the hot body 210 to the glass panel 100 during the heat chamfering. Alignment for the accurate overhang is critical for reliable and accurate process control.

In this regard, the heat chamfering apparatus according to some embodiments of the present disclosure may include an alignment unit 400 for aligning the glass panel 100 in position. The alignment unit 400 may align the edges of the glass panel 100 to outwardly overhang the contact support portion 310.

In some embodiments, the alignment unit 400 may include a first guide 410 configured to be in contact with the support unit and a second guide 420 configured to be in contact with some edges of the glass panel 100. The support unit may align the alignment unit 400 in position with respect to the position of the support unit by contact with the first guide 410. In addition, the alignment unit 400 may align the glass panel 100 in position by the second guide 420 in contact with the glass panel 100. In some embodiments, the first guide 410 and the second guide 420 may move integrally. For example, the first guide 410 and the second guide 420 may be formed integrally.

In some embodiments, the first guide 410 may include at least one protrusion protruding toward the support unit (e.g., the contact support portion 310) in a first direction perpendicular to the thickness direction of the glass panel 100 and at least one protrusion protruding toward the support unit in a second direction perpendicular to both the thickness direction of the glass panel and the first direction. In some embodiments, the second guide 420 may include at least one protrusion protruding toward the glass panel 100 in the first direction and at least one protrusion protruding toward the glass panel 100 in the second direction. The first guide 410 and the second guide 420 may be in contact with at least two sides of the support unit and at least two sides of the glass panel 100, respectively, and the present disclosure is not limited thereto.

Referring to FIG. 7, for example, the glass panel 100 may overhang by 500 μm, the protrusions of the first guide 410 may protrude by 1000 μm, and the protrusions of the second guide 420 may protrude by 500 μm.

After the glass panel 100 is placed on the contact support portion 310, the glass panel 100 is physically aligned by moving the alignment unit 400 until the first guide 410 is in contact with the support unit. In this manner, the heat chamfering apparatus according to the present disclosure can rapidly and easily align the glass panel 100.

In some embodiments, further to the first physical alignment of the glass panel 100 by the alignment unit 400, the position of the glass panel 100 may be accurately determined using a vision system, and then, second alignment of finely moving the glass panel 100 may be performed depending on the result of the accurate determination of the position.

The present disclosure is not limited to the foregoing embodiments described above and illustrated in the drawings. Rather, a person having ordinary skill in the art will appreciate that various modifications and changes are possible without departing from the scope of the appended claims. The features described in individual claims may be combined unless explicitly described to the contrary. For example, even when two dependent claims refer to an independent claim only, a heat chamfering apparatus or a heat chamfering method according to an embodiment of the present disclosure may include all of the features of the two dependent claims.

What is claimed is:

1. A heat chamfering apparatus comprising:
    a support unit configured to support a glass panel;
    a heat chamfering unit configured to heat-chamfer an edge of the glass panel by applying thermal shock thereto, wherein:
        the support unit comprises a contact support portion configured to support the glass panel while in contact with the glass panel and a base portion configured to support the contact support portion, the contact support portion being formed from a first material, and the base portion being formed from a second material, and
        the first material has lower thermal conductivity, a lower coefficient of thermal expansion, and lower hardness than the second material; and
    an alignment unit configured to align the glass panel in position,
    wherein the alignment unit aligns the glass panel such that the edge of the glass panel outwardly overhangs the contact support portion of the support unit.

2. The heat chamfering apparatus of claim 1, wherein the contact support portion has a plurality of suction holes configured to hold the glass panel by suction force.

3. The heat chamfering apparatus of claim 2, wherein each of the plurality of suction holes is provided along a peripheral portion of the contact support portion while being spaced apart from the edge of the contact support portion by a distance in a range from 1 mm to 5 mm.

4. The heat chamfering apparatus of claim 3, wherein the contact support portion comprises a first surface facing the glass panel and a second surface opposing the first surface, and
    the base portion comprises a third surface facing the second surface of the contact support portion,
    the third surface having a channel provided along a peripheral portion of the base portion so as to communicate with the plurality of suction holes.

5. The heat chamfering apparatus of claim 4, wherein the contact support portion and the base portion comprise mating stepped portions provided along peripheral portions thereof, respectively, the mating stepped portions being engaged with each other, and the channel is located inside the stepped portions.

6. The heat chamfering apparatus of claim 1, wherein the first material is carbon.

7. The heat chamfering apparatus of claim 6, wherein the second material is aluminum or an aluminum alloy.

8. The heat chamfering apparatus of claim 1, wherein the second material is aluminum or an aluminum alloy.

9. The heat chamfering apparatus of claim 1, wherein the alignment unit comprises:

a first guide configured to be in contact with the support unit; and a second guide configured to be in contact with the edge of the glass panel, wherein the support unit aligns the alignment unit in position with respect to a position of the support unit by contact with the first guide, and the alignment unit aligns the glass panel in position by the second guide in contact with the glass panel.

10. The heat chamfering apparatus of claim 9, wherein the first guide and the second guide are configured to move integrally.

11. The heat chamfering apparatus of claim 10, wherein the first guide comprises first protrusions respectively protruding toward the support unit in a first direction perpendicular to a thickness direction of the glass panel and a second direction perpendicular to both the thickness direction of the glass panel and the first direction, and the second guide comprises second protrusions respectively protruding toward the glass panel in the first direction and the second direction.

12. The heat chamfering apparatus of claim 9, wherein the first guide comprises first protrusions respectively protruding toward the support unit in a first direction perpendicular to a thickness direction of the glass panel and a second direction perpendicular to both the thickness direction of the glass panel and the first direction, and the second guide comprises second protrusions respectively protruding toward the glass panel in the first direction and the second direction.

13. The heat chamfering apparatus of claim 1, wherein the heat chamfering unit comprises:

a hot body configured to apply thermal shock to the edge of the glass panel by contact therewith; and a heater configured to heat the hot body, wherein the contact support portion is located closer to the heater than the base portion is.

14. A heat chamfering method comprising:

locating a glass panel on a support unit; and heat-chamfering an edge of the glass panel by applying thermal shock thereto, wherein:

the support unit comprises a contact support portion supporting the glass panel while in contact with the glass panel and a base portion supporting the contact support portion, the contact support portion being formed from a first material, and the base portion being formed from a second material, and the first material having lower thermal conductivity, a lower coefficient of thermal expansion, and lower hardness than the second material; and aligning a glass panel in position by an alignment unit, wherein the alignment unit aligns the glass panel such that the edge of the glass panel outwardly overhangs the contact support portion.

15. The heat chamfering method of claim 14, wherein heat-chamfering the edge of the glass panel comprises relatively moving a hot body along an edge of the glass panel while allowing the hot body to be in contact with the edge of the glass panel.

* * * * *